United States Patent
Takuma (10) Patent No.: US 9,885,238 B2
(45) Date of Patent: Feb. 6, 2018

(54) METHOD OF PREVENTING LEAKAGE OF AIR INSIDE UNDERGROUND CAVERN

(71) Applicant: Norikata Takuma, Tokyo (JP)

(72) Inventor: Norikata Takuma, Tokyo (JP)

( * ) Notice: Subject to any disclaimer, the term of this patent is extended or adjusted under 35 U.S.C. 154(b) by 0 days.

(21) Appl. No.: 15/285,879

(22) Filed: Oct. 5, 2016

(65) Prior Publication Data

US 2017/0248018 A1 Aug. 31, 2017

(30) Foreign Application Priority Data

Feb. 29, 2016 (JP) .................................. 2016-037321

(51) Int. Cl.
*B65G 5/00* (2006.01)
*E21D 11/00* (2006.01)
(Continued)

(52) U.S. Cl.
CPC ................ *E21D 11/00* (2013.01); *B65G 5/00* (2013.01); *E21B 33/138* (2013.01); *E21D 13/00* (2013.01)

(58) Field of Classification Search
CPC . B65G 5/00; B65G 5/005; F17C 1/007; F17C 3/005; F17C 2221/00;
(Continued)

(56) References Cited

U.S. PATENT DOCUMENTS 4,009,063 A * 2/1977 Wood ...................... B29C 53/36
156/71
4,379,870 A * 4/1983 Matsumoto ......... B29C 47/0004
428/323
(Continued)

FOREIGN PATENT DOCUMENTS

JP 4-336126 A 11/1992
JP 7-18998 A 1/1995
(Continued)

OTHER PUBLICATIONS

Uchiyama et al, "Technical Assessment and Economic Study of Compressed Air Energy Storage in Japan," CRIEPI Research Report No. Y90002, Central Research Institute of Electric Power Industry, May 1990, pp. 1-42.
(Continued)

*Primary Examiner* — Benjamin Fiorello
*Assistant Examiner* — Edwin Toledo-Duran
(74) *Attorney, Agent, or Firm* — Dilworth & Barrese, LLP (57) ABSTRACT

The water-insoluble filler in the form of bubbles is provided into the underground cavern. Then, the filler thus provided is allowed to adhere to a bottom surface and a lower wall surface of the underground cavern to permeate thereinto. Subsequently, the filler having permeated is cured. Here, the water-insoluble filler in the form of bubbles may be provided again into the underground cavern. Moreover, water is poured into the underground cavern to float up the filler. The filler having floated up is allowed to adhere to an upper wall surface and a ceiling surface of the underground cavern to permeate thereinto. Thereafter, the filler having permeated is cured. Here, when the filler is allowed to permeate an inner surface of the underground cavern, a pressure inside the underground cavern may be increased. Additionally, when the filler is cured, a temperature inside the underground cavern may be increased.

8 Claims, 3 Drawing Sheets

(51) Int. Cl.
*E21D 13/00* (2006.01)
*E21B 33/138* (2006.01)

(58) Field of Classification Search
CPC .......... F17C 2270/0155; F17C 2203/00; F17C 2203/0604; F17C 2203/0607; F17C 2270/0149; F17C 2270/0152; B65D 88/34; B65D 90/22; B65D 90/48; E21F 17/16; E21F 17/18; E21D 11/00; E21D 11/003; E21D 11/006; E21D 11/04; E21D 11/05; E21D 11/10; E21D 11/105; E21D 11/38; E21D 11/36; E21D 11/381; E21D 11/383; E21D 11/385
USPC .............................. 405/52, 53, 54, 55, 56, 57
See application file for complete search history.

(56) References Cited

U.S. PATENT DOCUMENTS

| | | | | |
|---|---|---|---|---|
| 4,492,494 | A * | 1/1985 | Szekely | C09K 3/18 405/263 |
| 4,695,188 | A * | 9/1987 | Pulkkinen | E21D 11/383 405/146 |
| 4,915,542 | A * | 4/1990 | Fernando | E21D 11/383 405/132 |
| 4,940,360 | A * | 7/1990 | Weholt | E21D 11/14 405/132 |
| 5,002,438 | A * | 3/1991 | Strong | E02D 29/12 405/133 |
| 5,439,319 | A * | 8/1995 | Flanagan | E21D 11/383 156/287 |
| 5,470,178 | A * | 11/1995 | Weholt | E21D 11/38 405/150.1 |
| 5,480,260 | A * | 1/1996 | Shattuck | E02B 11/005 405/150.1 |
| 5,645,217 | A * | 7/1997 | Warren | B29B 7/7447 239/112 |
| 5,879,501 | A * | 3/1999 | Livingston | B29C 63/346 156/242 |
| 6,402,427 | B1 * | 6/2002 | James | E01D 22/00 405/132 |
| 6,663,016 | B2 * | 12/2003 | Bien | E01C 19/08 239/130 |
| 6,761,504 | B1 * | 7/2004 | Brandenberger | E21D 11/383 405/150.1 |
| 6,955,502 | B2 * | 10/2005 | Warren | E21D 11/38 264/32 |
| 8,342,776 | B2 * | 1/2013 | Watson | E21F 17/103 299/12 |
| 8,777,522 | B2 * | 7/2014 | Watson | E21F 17/103 299/11 |
| 2005/0095066 | A1 * | 5/2005 | Warren | E21D 11/38 405/146 |

FOREIGN PATENT DOCUMENTS

| | | |
|---|---|---|
| JP | 2001-140268 A | 5/2001 |
| JP | 2015-36487 A | 2/2015 |

OTHER PUBLICATIONS

"Site Proving Test for Compressed Air Energy Storage by Rock Mass Sealing," CRIEPI Research Report No. U31, Central Research Institute of Electric Power Industry, Jan. 1997, pp. 1-116.

* cited by examiner

METHOD OF PREVENTING LEAKAGE OF AIR INSIDE UNDERGROUND CAVERN

TECHNICAL FIELD

The invention of the application relates to a method of preventing leakage of air inside an underground cavern, and more particularly, to a method of preventing leakage of air inside an underground cavern employed in compressed air energy storage (CAES).

BACKGROUND ART

Humans need energy to live in society. Indeed, various forms of energy are used in daily life. Electrical energy is a typical example among those forms of energy. To those who consume electrical energy, the way to use electricity (consume power) considerably fluctuates even during a day. To those who generate electricity, on the other hand, continuous operation of a large-scale power station at a constant level is efficient, and it is difficult to synchronize at short intervals with the small daily fluctuations in power consumption.

In addition to the above, various methods of using natural energy such as wind power, sunlight, wave power, and geothermal energy are under discussion and consideration, but often, electricity generation by natural energy does not match the needs of a human society.

In order to fill the gap described above, techniques of storing energy are required. The "CAES" is one of such methods.

The technique CAES is a system in which power generated during midnight at a gas turbine power station is used to store high-pressure air into a reservoir, for example, an underground cavern or a seabed tank in the form of pressure potential, and electricity is generated by use of the stored high-pressure air when the power consumption is high during the daytime.

Regarding the electricity generation systems using compressed air energy storage, reports are presented by the Central Research Institute of Electric Power Industry (incorporated foundation) (see Non-patent Literatures 1 and 2).

Compressed air energy storage (CAES) is implemented in Germany and the United States.

In these countries, compressed air is stored underground in halite layers.

In Japan, which has no halite layers, a possible way is to dig an underground cavern or to install a storage tank on the seabed.

The efficiency of the CAES is currently inferior to that of superconductivity but is superior to that of pumped-storage hydroelectricity. Technological advancements in the future may bring the efficiency of the CAES near the level of superconductivity.

At the current level of technology, it is possible to dig out a cavern for the CAES in hard rock, but there are problems with digging out soft rock and installing a seabed tank.

The CAES for a cavern in hard rock is, under favorable conditions, economically competitive against the pumped-storage hydroelectricity and LNG-combined cycle electricity generation.

Other storage methods require technological development which enhances economic efficiency.

If all fossil-fuel power stations were to be replaced with CAES's, 55% of the current amount of fuel consumption could be saved.

If the CAES could be implemented in the underground soft rock of the suburbs of a large city, problems as with installation of power cables would be alleviated, and the CAES would provide distributed generation in the city.

As of 1990, programs for compressed air storage gas turbine electricity generation listed countries such as Germany (former West Germany), Italy, the United States, Ukraine (the former Soviet Union), France, Luxembourg, and Japan, and halite layers are often designated. Since Japan has no halite layers, however, digging of a cavern in bedrock is planned to be conducted.

In an example of operation, which is under way in Germany, a cylindrical cavern is formed in a halite layer, and it measures 55 m in diameter and 150 m in length.

The compressed air storage is divided into two, namely, variable-pressure storage and constant-pressure storage, and their storage volumes vary depending on the storage pressure. The constant-pressure storage can reduce the storage volume. In comparison with the pumped-storage hydroelectricity, for example, the pressure potential of air of 80 atm with volume 1 m$^3$ equals the potential energy of water of 1 m$^3$ lifted to the height of 810 m.

In order to achieve, for example, 10 hours of electricity generation at 100,000 kW using an existing gas turbine in the case of the constant-pressure storage, the storage volume necessary for the electricity generation is calculated to 140,000 m$^3$ for storage at 30 atm, and 84,000 m$^3$ for storage at 50 atm.

As described above, at a constant pressure, it is advantageous to store compressed air at high pressure (high storage pressure) since the storage volume is small. Conversely stated, in a cavern where there is leakage of air, the storage pressure decreases and loss is incurred despite a large amount of civil engineering operation. Some countries create and make practical use of caverns for storage of compressed air in halite layers, but Japan has no halite layers with such favorable conditions, but rather, weak strata of earth with many faults. Hence, it is necessary to develop a technique capable of creating a cavern for the storage of the compressed air without the leakage of air even in such strata of earth.

Given the circumstances, regarding the making of an underground cavern, there has been proposed a method of making a seal layer with a predetermined thickness along an inner wall of a storage space by: placing a flexible water-tight balloon inside the storage space, then providing a filler between the balloon and the storage space and supplying pressurized water inside the balloon, and curing the filler provided between the balloon and the storage space, as a method capable of effectively filling numerous cracks in the inner wall of the storage space (see Patent Literature 1).

Since the underground cavern used in the CAES is very large, however, it is troublesome to place the balloon inside the underground cavern and make the seal layer along the inner wall of the underground cavern which serves as the storage space for the compressed air, not to mention the manufacturing and the preparing of the balloon fitted to the inner shape of the underground cavern.

PRIOR ART DOCUMENTS

Patent Documents

Patent Document 1: Japanese Patent Application Publication No. He 7-18998

Non-Patent Documents

Non-patent Document 1: "CRIEPI Research Report" No. Y90002, titled "TECHNICAL ASSESSMENT AND ECONOMIC STUDY OF COMPRESSED-AIR ENERGY STORAGE IN JAPAN", published in May 1990 by the Central Research Institute of Electric Power Industry Non-patent Document 2: "CRIEPI Research Report" No. U31, titled "SITE PROVING TEST FOR COMPRESSED AIR ENERGY STORAGE BY ROCK MASS SEALING", published in January 1997 by the Central Research Institute of Electric Power Industry

SUMMARY OF INVENTION

Technical Problem

The present invention has been made in view of the aforementioned problems, and an object thereof is to provide a technique which makes it possible to easily and efficiently prepare in advance and work at site, in a method of preventing leakage of air inside an underground cavern used for CAES.

Solution to Problem

A method of preventing leakage of air inside an underground cavern according to the present invention includes at least the steps of: providing a filler into an underground cavern; allowing the filler thus provided to adhere to an inner surface of the underground cavern; allowing the adhering filler to permeate the inner surface of the underground cavern; and curing the filler having permeated the inner surface. The step of providing the filler into the underground cavern includes employment of a water-insoluble filler in a form of bubbles, and the step of allowing the filler to adhere to the inner surface of the underground cavern includes pouring of water into the underground cavern to allow the water-insoluble filler in the form of bubbles to float up.

In the present invention, the step of allowing the filler to adhere to the inner surface of the underground cavern may include a primary step of allowing the filler to adhere to a bottom surface and a lower wall surface of the underground cavern, and a secondary step of allowing the filler to adhere to an upper wall surface and a ceiling surface of the underground cavern. After the water-insoluble filler in the form of bubbles is provided into the underground cavern, which is followed by the primary step, the secondary step may be conducted by pouring the water into the underground cavern to allow the water-insoluble filler in the form of bubbles to float up.

Here, a step of providing again, prior to the secondary step, the water-insoluble filler in the form of bubbles into the underground cavern may be included.

In addition, in the present invention, the step of providing the filler into the underground cavern may further include employment of a water-insoluble filler in a form of liquid, the step of allowing the filler to adhere to the inner surface of the underground cavern may include a primary step of allowing the filler to adhere to a bottom surface and a lower wall surface of the underground cavern, and a secondary step of allowing the filler to adhere to an upper wall surface and a ceiling surface of the underground cavern, and after the water-insoluble filler in the form of liquid is provided into the underground cavern, which is followed by the primary step, the water-insoluble filler in the form of bubbles may be provided into the underground cavern, and the secondary step may be further conducted by pouring the water into the underground cavern to allow the water-insoluble filler in the form of bubbles to float up.

What is more, in the present invention, the step of allowing the filler to permeate the inner surface of the underground cavern, i.e., the bottom surface, the wall surfaces, and the ceiling surface of the underground cavern, may be conducted by increasing a pressure inside the underground cavern.

Still more, in the present invention, the step of curing the filler may be conducted by increasing a temperature inside the underground cavern.

Advantageous Effects of Invention

In the method of preventing the leakage of air inside the underground cavern disclosed in the present invention, the water-insoluble filler in the form of bubbles is provided into the underground cavern. Then, the filler is allowed to adhere to the inner surface of the underground cavern to permeate thereinto. Finally, the filler is cured. Hence, it is unnecessary to make preparation such as manufacture of a balloon. By merely providing the filler, which is formed into bubbles at operation site, into the underground cavern, a seal layer of the filler can easily be made along the inner wall of the underground cavern which serves as the storage space for the compressed air.

Additionally in the present invention, the water-insoluble filler in the form of bubbles is allowed to adhere to the inner surface of the underground cavern while water is being poured into the underground cavern to allow the filler to float up. Hence, since the filler in the form of bubbles floats up due to a difference in specific gravity between the filler and the water, it is possible to make sure that the filler efficiently adheres gradually to the entire inner surface of the underground cavern from lower positions to higher positions, and up to the ceiling surface, as the amount of water poured into the underground cavern increases. Moreover, since the filler is water-insoluble, there is no risk of dissolving in water while the filler is rising up.

DESCRIPTION OF EMBODIMENTS

An example of embodiments of a method of preventing leakage of air inside an underground cavern according to the present invention will be described below with reference to the drawings.

Note that the embodiments described below have various technical limitations since they are specific examples suitable for the present invention. However, the scope of the present invention is not limited to these embodiments unless otherwise noted in the following description.

First, the present invention includes, as a basic setting, at least: a first step of providing a filler into the underground cavern; a second step of allowing the filler thus provided to adhere to an inner surface of the underground cavern; a third step of allowing the adhering filler to permeate the inner surface of the underground cavern; and a fourth step of curing the filler having permeated the inner surface. Additionally, as a basic setting, the first step of the present invention also includes employment of a water-insoluble filler in the form of bubbles, and the second step of the present invention also includes pouring water into the underground cavern to allow the water-insoluble filler in the form of bubbles to float up.

To put it differently, main features of the present invention are to employ the water-insoluble filler, to employ the filler in the form of bubbles, and to allow the water-insoluble filler in the form of bubbles to float up due to a difference in specific gravity between the filler and water. Here, the water through which the filler floats up may be seawater.

<First Embodiment>

In the method of preventing the leakage of air inside the underground cavern according to the present invention, the second step includes, in the basic setting described above, a primary step of allowing the water-insoluble filler in the form of bubbles to adhere to a bottom surface and a lower wall surface of the underground cavern, and a secondary step of allowing the water-insoluble filler in the form of bubbles to adhere to an upper wall surface and a ceiling surface of the underground cavern while allowing the water-insoluble filler in the form of bubbles to float up by pouring water into the underground cavern.

In the embodiment, the first to fourth steps described above are conducted in the order shown in detail below.

Figure 1A:
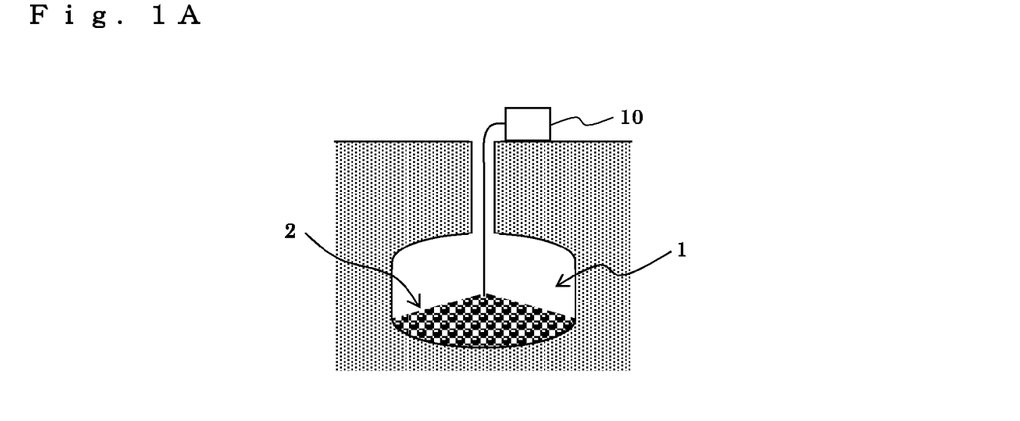
FIGS. 1A to 1C are schematic diagrams illustrating steps of a method which prevents leakage of air inside an underground cavern according to the present invention.

First, as illustrated in FIG. 1A, a water-insoluble filler 2 in the form of bubbles is provided into an underground cavern 1 through a shaft which reaches the underground cavern 1 (first step).

In the present invention, the filler 2 is not particularly limited as long as the filler 2: cures with time; adheres to the inner surface of the underground cavern 1; permeates into cracks and the like (not illustrated) in the inner surface and then cures, or in other words can harden gradually with time; and is water-insoluble matter which can be in the form of bubbles with a specific gravity smaller than that of water.

A polyurethane foam based bedrock solidifying grout used in civil engineering constructions such as tunnels and dams can be listed as the above filler 2, for example. The polyurethane foam based bedrock solidifying grout is applicable to the present invention by appropriately adjusting its viscosity and solidification time. In addition, cellulose nanofiber (CNF) with excellent gas barrier properties might be applicable.

Meanwhile, a method of providing the filler 2 is not particularly limited, either. Thus, in the present invention, a direct method may be adopted in which the filler 2 initially in the form of bubbles is provided into the underground cavern 1, or alternatively, an indirect method may be adopted in which the filler initially in the form of liquid or paste is provided into the underground cavern 1, and then is immediately subjected to foaming to create the filler 2 in the form of bubbles. Incidentally, the filler 2 may be one-component or a two-component mixture.

Such filler 2 can be provided into the underground cavern using a filling unit 10 provided with, for example, a filler tank, an pouring pump, a hose, a mixing unit and the like depending on the necessity.

Figure 1B:
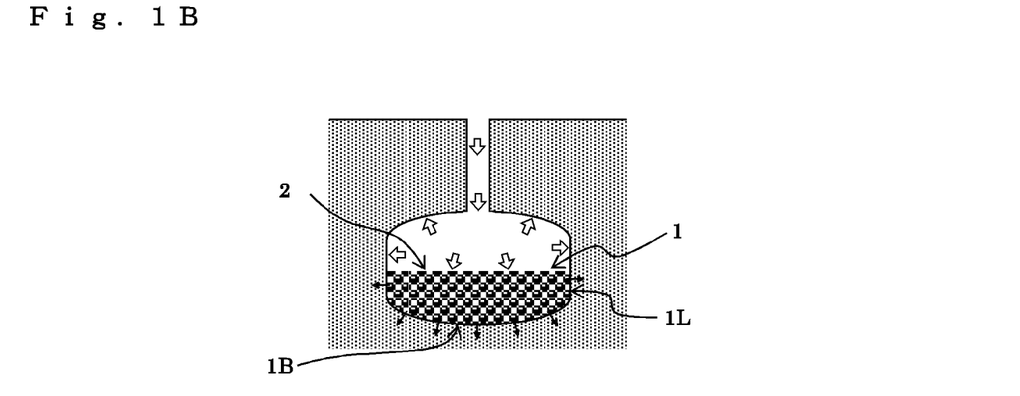

Next, as illustrated in FIG. 1B, the filler 2 thus provided is allowed to adhere to a bottom surface 1B and a lower wall surface 1L of the underground cavern 1 (the primary step of the second step). Here, allowing the filler 2 to adhere means to fill fissures and holes which can lead to the leakage of air, and to form a coating layer of the filler 2 on the inner surface of the underground cavern 1.

Moreover, as indicated with arrows in the figure, the filler 2 adhering to the bottom surface 1B and the lower wall surface 1L of the underground cavern 1 is allowed to permeate into the cracks and the like in the bottom surface 1B and the lower wall surface 1L of the underground cavern 1 (third step). Here, allowing the filler 2 to permeate means to spread the filler 2 into cracks which cannot be filled at the second step, or into remaining fissures and holes which were not filled at the second step.

The step of allowing the filler 2 to permeate the inner surface (the bottom surface 1B and the lower wall surface 1L) of the underground cavern 1 in the embodiment can be achieved by, for example, sending air or gas into the underground cavern 1 and thereby pressurizing the inside thereof, as indicated with white arrows in the figure. In other words, by pressurizing the underground cavern 1, the filler 2 is pushed into the small fissures and the like in the inner surface of the underground cavern 1, and thereby permeation of the filler 2 into the inner surface of the underground cavern 1 is facilitated.

Subsequently, the filler 2, which has permeated the bottom surface 1B and the lower wall surface 1L of the underground cavern 1, is cured (fourth step).

In the embodiment, the step of curing the filler 2 can be achieved by, for example, sending a hot current of air into the underground cavern 1 and thereby raising the temperature inside the underground cavern 1. In other words, by heating the inside of the underground cavern 1 using a thermosetting filler, the curing of the filler 2, which has permeated the inner surface of the underground cavern 1, is facilitated.

In addition, at the step of curing the filler 2 in the present invention, the filler is not limited to the thermosetting filler. The underground cavern 1 may be exposed to radiation using an electron-beam (EB) curable filler, or may be irradiated with ultraviolet rays using an ultraviolet-curable filler to facilitate the curing of the filler.

Figure 1C:
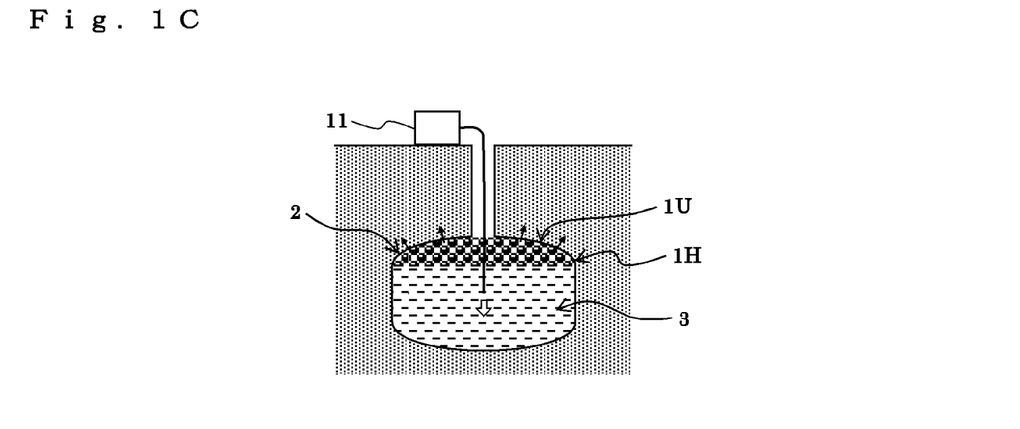

Moreover, as illustrated in FIG. 1C of the embodiment, water 3 is poured into the underground cavern 1 and the water-insoluble filler 2 in the form of bubbles is allowed to float up. Then, the filler 2 having floated up is allowed to adhere to an upper wall surface 1H and a ceiling surface 1U of the underground cavern 1 (the secondary step of the second step). To put it differently, the water 3 is poured into the underground cavern using a water supplier 11, and the filler 2 in the form of bubbles is allowed to float up due to a difference in specific gravity between the filler 2 in the form of bubbles and the water 3. The filler 2 in the form of bubbles having floated up reliably adheres to the upper wall surface 1H and the ceiling surface 1U of the underground cavern 1 regardless of the shapes of the surfaces.

Thereafter, as indicated with arrows in the figure, the filler 2 adhering to the upper wall surface 1H and the ceiling surface 1U of the underground cavern 1 is allowed to permeate into the cracks and the like (not illustrated) in the upper wall surface 1H and the ceiling surface 1U of the underground cavern 1 by pressurizing the underground cavern 1, as with the filler 2 adhering to the bottom surface 1B and the lower wall surface 1L of the underground cavern 1 (third step).

At this moment in the present invention, by pressurizing the underground cavern 1 for the purpose of facilitating the permeation of the filler 2 into the inner surface of the underground cavern 1, it is possible to know whether there is leakage of air inside the underground cavern 1. In other words, when the pressure is measured during the pressurization of the underground cavern 1 and if the pressure does not decrease while the underground cavern 1 is being pressurized, it can be determined that there is no leakage of air inside the underground cavern 1. On the other hand, if the pressure inside underground cavern 1 gradually decreases, it is determined that there is somewhere leakage of air. Thus, the above described first to third steps may be repeated.

Thereafter, the filler 2 having permeated the upper wall surface 1H and the ceiling surface 1U of the underground cavern 1 is cured (fourth step). Here, the curing of the filler 2 may be conducted, for example, as follows: first, at the third step, a cool current of air is sent into the underground cavern to increase the pressure inside, and thereby the permeation of the filler into the inner surface of the underground cavern is facilitated; then, at the fourth step, the temperature of the air being sent into the underground cavern is increased to facilitate the curing of the filler having permeated the inner surface of the underground cavern.

Additionally in the present invention, at the secondary step of the second step, when water is poured into the underground cavern to allow the water-insoluble filler in the form of bubbles to float up, hot water may be poured instead of the cold water to facilitate the adhesion and permeation of the filler having floated up into the inner surface of the underground cavern, as well as the curing of the filler. It is a matter of course that the air or the gas may be sent into the underground cavern to increase the pressure inside simultaneously with the pouring of the hot water into the underground cavern, thereby further facilitating the adhesion and permeation of the filler having floated up into the inner surface of the underground cavern. Moreover, the underground cavern may be pressurized by sending the hot current of air simultaneously with the pouring of the hot water into the underground cavern to further facilitate the adhesion and permeation of the filler having floated up into the inner surface of the underground cavern, as well as the curing of the filler.

As described above, the filler adheres to the inner surface of the underground cavern storing the compressed air. Then, the filler permeates the cracks and the like in the underground cavern and cures. The coating layer of the filler is thereby efficiently formed on the inner surface of the underground cavern. Thus, it is possible to prevent the leakage of air inside the underground cavern.

Note that although the water (or the hot water) 3 poured into the underground cavern 1 may be discharged after the secondary step of the second step, the water (or the hot water) may be discharged after the third step in order to efficiently perform operation of pressurizing the underground cavern 1. In other words, when the water 3 is contained in the underground cavern 1, the amount of air to be sent to increase the pressure inside underground cavern 1 is small. Alternatively, the water 3 poured into the underground cavern 1 may be discharged after the fourth step being the last step.

<Second Embodiment>

Taking into consideration the fact that all the filler provided at the first step cures, the first embodiment of the present invention can further include a step of providing again the water-insoluble filler in the form of bubbles into the underground cavern, where the step follows the primary step at which the filler having permeated the bottom surface and the lower wall surface of the underground cavern is cured, and precedes the secondary step at which the water is poured. In other words, the second embodiment is different from the above described first embodiment in that the second embodiment further includes, prior to the secondary step, the step of additionally providing the water-insoluble filler in the form of bubbles into the underground cavern.

Note that in embodiments to be described below, points different from those of the above described first embodiment are mainly explained. Hence, configurations identical to those of the first embodiment are assigned identical signs and explanations thereof are omitted. Those configurations are regarded as identical unless otherwise noted.

In the embodiment, the first to fourth steps described above are conducted in the order shown in detail below.

First, using the filling unit 10, the water-insoluble filler in the form of bubbles is provided into the underground cavern 1 through the shaft which reaches the underground cavern 1 (first step).

Next, the filler thus provided is allowed to adhere to the bottom surface and the lower wall surface of the underground cavern (the primary step of the second step).

Moreover, the filler adhering to the bottom surface and the lower wall surface of the underground cavern is allowed to permeate into the cracks and the like in the bottom surface and the lower wall surface of the underground cavern (third step).

Subsequently, the filler having permeated the bottom surface and the lower wall surface of the underground cavern is cured (fourth step). The procedures up to here are identical to those of the above described first embodiment.

In the embodiment, the water-insoluble filler in the form of bubbles is provided again into the underground cavern (first step). In other words, to make sure that the filler adheres to the upper wall surface and the ceiling surface of the underground cavern, the water-insoluble filler in the form of bubbles is provided to add to the underground cavern.

Next, as in the case of the first embodiment described above, the water is poured into the underground cavern, and the additionally-provided water-insoluble filler in the form of bubbles is allowed to float up. Then, the filler having floated up is allowed to adhere to the upper wall surface and the ceiling surface of the underground cavern (the secondary step of the second step).

Thereafter, the filler adhering to the upper wall surface and the ceiling surface of the underground cavern is allowed to permeate into the cracks and the like in the upper wall surface and the ceiling surface of the underground cavern (third step).

Finally, the filler having permeated the upper wall surface and the ceiling surface is cured (fourth step).

Thus, it is possible to make sure that a coating of the filler is formed through the adhesion and permeation of the filler into the upper wall surface and the ceiling surface of the underground cavern, and thereby the leakage of air inside the underground cavern can be prevented.

<Third Embodiment>

What is more, in the present invention, efficient permeation of the filler can be achieved at the step of allowing the filler to permeate the inner surface of the underground cavern. In other words, the third embodiment is different from the above described first embodiment in that the third embodiment includes a step of providing the water-insoluble filler in the form of liquid into the underground cavern.

In the embodiment, the first to fourth steps described above are conducted in the order shown below.

Figure 2A:
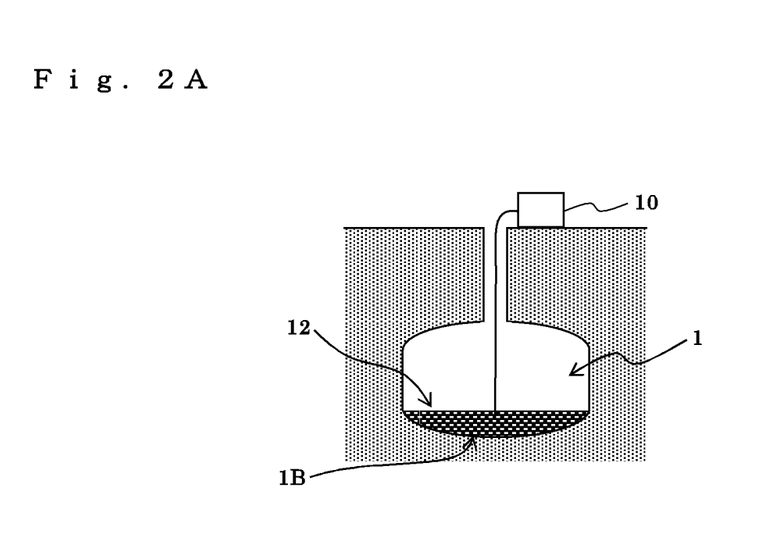
FIGS. 2A to 2D are schematic diagrams illustrating steps of another method which prevents the leakage of air inside the underground cavern according to the present invention.

First, as illustrated in FIG. 2A, the water-insoluble filler 12 in the form of liquid is provided into the underground cavern 1 through the shaft which reaches the underground cavern 1 using the filling unit 10 (first step). Then, the filler 12 thus provided is allowed to adhere to the bottom surface 1B of the underground cavern 1 (the primary step of the second step).

Figure 2B:
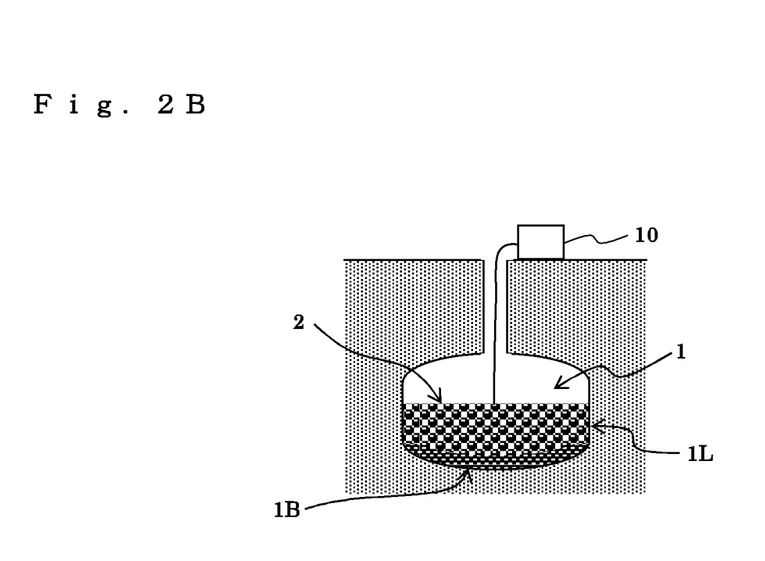

Subsequently, as illustrated in FIG. 2B, the water-insoluble filler 2 in the form of bubbles is further provided into the underground cavern 1 (first step) as with the water-insoluble filler 12 in the form of liquid, and the filler 2 thus provided is allowed to adhere to the lower wall surface 1L of the underground cavern 1 (the primary step of the second step).

Figure 2C:
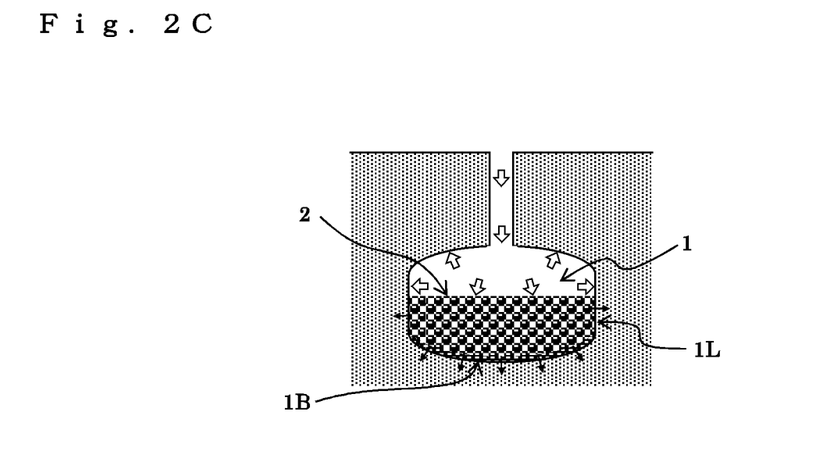

Moreover, as indicated with white arrows in FIG. 2C, the air or the gas is sent into the underground cavern 1 to increase the pressure inside. As indicated with arrows in the figure, the filler 12 and the filler 2, which are adhering to the bottom surface 1B and to the lower wall surface 1L of the underground cavern 1, respectively, are pushed to permeate into the cracks and the like (not illustrated) (third step).

Then, the filler 2 having permeated the bottom surface 1B and the lower wall surface 1L of the underground cavern 1 is cured (fourth step).

Figure 2D:
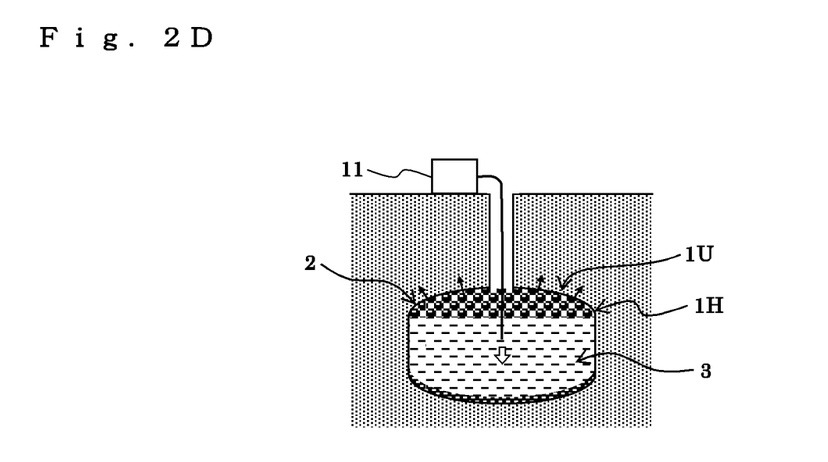

Thereafter, as illustrated in FIG. 2D, the water (or the hot water) is poured into the underground cavern 1 and the water-insoluble filler 2 in the form of bubbles is allowed to float up. Then, filler 2 having floated up is allowed to adhere to the upper wall surface 1H and the ceiling surface 1U of the underground cavern 1. As indicated with arrows in the figure, filler 2 is allowed to permeate into the cracks and the like (not illustrated) in the upper wall surface 1H and the ceiling surface 1U of the underground cavern 1 (the secondary step of the second step and the third step). Here, the filler 2 adhering to the upper wall surface 1H and the ceiling surface 1U of the underground cavern 1 may be pushed to permeate into the cracks and the like by sending the air or the gas into the underground cavern 1 to increase the pressure inside.

Following the above step, the filler 2 having permeated the upper wall surface 1H and the ceiling surface 1U of the underground cavern 1 is cured (fourth step). Note that the water (or the hot water) 3 poured into the underground cavern 1 is discharged when needed.

Thus, as in the case of the above described first embodiment, the filler permeates the cracks and the like of the underground cavern, and the coating of the filler is formed on the inner surface of the underground cavern. Thereby, the leakage of air inside the underground cavern can be prevented.

REFERENCE SIGNS LIST

1 underground cavern
1B bottom surface
1L lower wall surface
1H upper wall surface
1U ceiling surface
2 filler (in the form of bubbles)
3 water
10 filling unit
11 water supplier
12 filler (in the form of liquid)

The invention claimed is:

1. A method of preventing leakage of air inside an underground cavern,
   comprising at least the steps of:
      providing a filler into an underground cavern;
      allowing the filler thus provided to adhere to an inner surface of the underground cavern;
      allowing the adhering filler to permeate the inner surface of the underground cavern; and
      curing the filler having permeated the inner surface, wherein
      the step of providing the filler into the underground cavern includes employment of a water-insoluble filler in a form of foamed bubbles, and
      the step of allowing the water-insoluble filler to adhere to the inner surface of the underground cavern includes introducing air or gas into the underground cavern and thereby pressurizing the interior thereof, and then pouring water into the underground cavern to allow the water-insoluble filler in the form of foamed bubbles to float up.

2. The method of preventing leakage of air inside an underground cavern according to claim 1, wherein
   the step of allowing the water-insoluble filler to adhere to the inner surface of the underground cavern includes
      a primary step of allowing the water-insoluble filler to adhere to a bottom surface and a lower wall surface of the underground cavern, and
      a secondary step of allowing the water-insoluble filler to adhere to an upper wall surface and a ceiling surface of the underground cavern, and
   after the water-insoluble filler in the form of foamed bubbles is provided into the underground cavern, which is followed by the primary step, the secondary step is conducted by pouring the water into the underground cavern to allow the water-insoluble filler in the form of foamed bubbles to float up.

3. The method of preventing leakage of air inside an underground cavern according to claim 2, wherein
   the step of curing the water-insoluble filler is conducted by increasing a temperature inside the underground cavern.

4. The method of preventing leakage of air inside an underground cavern according to claim 2, further comprising a step of providing again, prior to the secondary step, the water-insoluble filler in the form of foamed bubbles into the underground cavern.

5. The method of preventing leakage of air inside an underground cavern according to claim 4, wherein
   the step of curing the water-insoluble filler is conducted by increasing a temperature inside the underground cavern.

6. The method of preventing leakage of air inside an underground cavern according to claim 1, wherein
   the step of providing the water-insoluble filler into the underground cavern further includes employment of a second water-insoluble filler in a form of liquid,
   the step of allowing the first and second water-insoluble filler to adhere to the inner surface of the underground cavern includes
      a primary step of allowing the first and second water-insoluble filler to adhere to a bottom surface and a lower wall surface of the underground cavern, and a secondary step of allowing the first and second water-insoluble filler to adhere to an upper wall surface and a ceiling surface of the underground cavern, and after the second water-insoluble filler in the form of liquid is provided into the underground cavern, which is followed by the primary step, the first water-insoluble filler in the form of foamed bubbles is provided into the underground cavern, and the secondary step is further conducted by pouring the water into the underground cavern to allow the first water-insoluble filler in the form of foamed bubbles to float up with the second water-insoluble filler in the form of liquid.

7. The method of preventing leakage of air inside an underground cavern according to claim 6, wherein the step of curing the first and second water-insoluble filler is conducted by increasing a temperature inside the underground cavern.

8. The method of preventing leakage of air inside an underground cavern according to claim 1, wherein the step of curing the water-insoluble filler is conducted by increasing a temperature inside the underground cavern.

* * * * *